(12) United States Patent
Hanagan et al.

(10) Patent No.: US 6,464,030 B1
(45) Date of Patent: Oct. 15, 2002

(54) THREE WHEEL STEERING ASSEMBLY

(75) Inventors: Michael W. Hanagan, Monterey, CA (US); Donald D. Varner, Hollister, CA (US); John L. Ortiz, Capitola, CA (US); Vincente S. Zavata, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 7 days.

(21) Appl. No.: 09/836,693

(22) Filed: Apr. 17, 2001

(51) Int. Cl.⁷ .............................................. B62D 61/06
(52) U.S. Cl. ...................... 180/211; 180/409; 280/62; 280/92; 280/98
(58) Field of Search ................ 180/210, 211, 180/408, 409; 280/62, 92, 93.512, 771, 98

(56) References Cited

U.S. PATENT DOCUMENTS

| | | | |
|---|---|---|---|
| 2,559,379 A | | 7/1951 | Szekely |
| 2,788,858 A | | 4/1957 | Hasland et al. |
| 3,110,352 A | * | 11/1963 | McClarnon ................. 180/211 |
| 3,610,358 A | * | 10/1971 | Korff ............................ 180/11 |
| 3,998,288 A | | 12/1976 | Aoki |
| 4,020,914 A | * | 5/1977 | Trautwein .................... 180/15 |
| 4,162,605 A | * | 7/1979 | Olin et al. .................. 180/211 |
| 4,353,567 A | * | 10/1982 | Weldy ......................... 180/211 |
| 4,546,997 A | * | 10/1985 | Smyers ....................... 180/210 |
| 4,573,546 A | * | 3/1986 | Irimajiri et al. ............. 180/211 |
| 4,589,510 A | | 5/1986 | Düerwald et al. |
| 4,662,467 A | * | 5/1987 | Arai et al. ................... 180/210 |
| 4,697,663 A | * | 10/1987 | Trautwein ................... 180/210 |
| 4,703,824 A | | 11/1987 | Irimajiri et al. |
| 4,778,024 A | | 10/1988 | Matsumoto et al. |
| 4,787,470 A | * | 11/1988 | Badsey ........................ 180/210 |
| 5,116,069 A | * | 5/1992 | Miller ......................... 180/210 |
| 5,238,258 A | * | 8/1993 | Michaud ..................... 180/210 |
| 5,248,011 A | * | 9/1993 | Richards ..................... 180/215 |
| 5,431,243 A | | 7/1995 | Richards |
| 5,960,901 A | * | 10/1999 | Hanagan ..................... 180/210 |
| 6,015,022 A | * | 1/2000 | Thuliez ....................... 180/210 |
| 6,367,824 B1 | * | 4/2002 | Hayashi ............... 280/124.103 |

FOREIGN PATENT DOCUMENTS

| | | | | |
|---|---|---|---|---|
| JP | 359213572 A | * | 12/1984 | ................. 280/62 |
| JP | 359213573 A | * | 12/1984 | ................. 280/62 |

* cited by examiner

Primary Examiner—Paul N. Dickson
Assistant Examiner—Deanna Draper
(74) Attorney, Agent, or Firm—Pepe & Hazard LLP

(57) ABSTRACT

A vehicle has a chassis with at least one front wheel pivotable about a first vertical axis to control the direction of the vehicle. A rigid swing arm is pivotally mounted on the rear end of the chassis for pivoting about a horizontal axis. On the rear end of the swing arm is a wheel mounting assembly including a hub and pivot means mounting the hub on the rear end of the swing arm for pivotal movement about a second vertical axis. The rear wheel is rotatably supported on the hub and naturally tracks the front wheel in a cooperating turning arc.

9 Claims, 6 Drawing Sheets

THREE WHEEL STEERING ASSEMBLY

BACKGROUND OF THE INVENTION

The present invention relates to vehicles, and, more particularly, to two and three wheeled vehicles which utilize a swing arm upon which the rear wheel is supported.

Two and three wheel vehicles such as motorcycles most usually steer the vehicle by turning only the front wheel(s). In such vehicles, the rear wheel generally is in a fixed position to rotate in a generally vertical plane extending parallel to the longitudinal axis of the vehicle. The rear wheel in motorcycles is frequently supported at the rear end of a swing arm which is pivotably supported at its front end of the chassis or frame of the vehicle.

When such vehicles turn, the front wheel(s) is pivoted about a generally vertical axis in the direction of the turn. However, the rear tire continues its rotation in a vertical plane parallel to the longitudinal axis. The lateral force acting on the tire as the vehicle orients its longitudinal axis in the direction of the turn causes the rear tire to "scrub" or slide sideways away from the direction of the turn. Such sidewise movement of the rear tire produces tread wear, the potential for loss of control, and loss of speed.

It is an object of the present invention to provide a novel vehicle rear wheel assembly which enables the rear wheel to pivot about a generally vertical axis to track more closely the turning radius of the front wheel(s).

It is also an object to provide such a vehicle rear wheel steering assembly which is relatively easy and economical to fabricate.

Another object is to provide such a vehicle rear wheel steering assembly in which the rear wheel is hydraulically pivoted together with the front wheel(s).

SUMMARY OF THE INVENTION

It has now been found that the foregoing and related objects may be readily attained in a vehicle which has a chassis with a front and rear ends and a longitudinal axis. At least one front wheel is mounted on the front end of the chassis for rotation about a first horizontal axis and for pivoting about a first vertical axis to control the direction of the vehicle. A rigid swing arm has its front end pivotally mounted on the rear end of the chassis for pivoting about a second horizontal axis perpendicular to the longitudinal axis.

On the rear end of the swing is a wheel mounting assembly arm including a hub and pivot means mounting the hub on the rear end of the swing arm for pivotal movement about a second generally vertical axis with respect to the second horizontal axis and the longitudinal axis. Rotatably supported on the hub for rotation about a third horizontal axis is a rear wheel whereby the rear wheel naturally tracks the front wheel in a cooperating turning arc.

Preferably, the vehicle includes a shock absorber having a rear end mounted on the rigid swing arm and a front end mounted on the rear end of the chassis to limit the oscillation or pivotal movement of the rigid arm about the second horizontal axis. A dampening mechanism having a rear end pivotally mounted to the pivot means and a front end pivotally mounted on the swing arm provides tension and resists movement of the hub about the second vertical axis.

The rear wheel assembly includes a clevis member with an axle extending therefrom, bearing means on the axle and a wheel rotatably seated on the bearing means. The wheel mounting assembly also includes a king pin seated in the clevis member and located on the center line of the rear wheel. A bell crank is pivotably connected to the swing arm and supported in the clevis on the king pin, and the bell crank couples the swing arm to the clevis. The bell crank is also pivotally connected to one end of the dampening mechanism, and the other end of the dampening mechanism is connected to a strut on the swing arm adjacent its front end.

In a preferred embodiment, the dampening mechanism is a hydraulic steering piston/cylinder coupled to the steering mechanism for the front wheel to effect limited rotation of the bell crank and thereby the rear wheel assembly about the second vertical axis.

DETAILED DESCRIPTION OF THE PREFERRED EMBODIMENT

Figure 1:
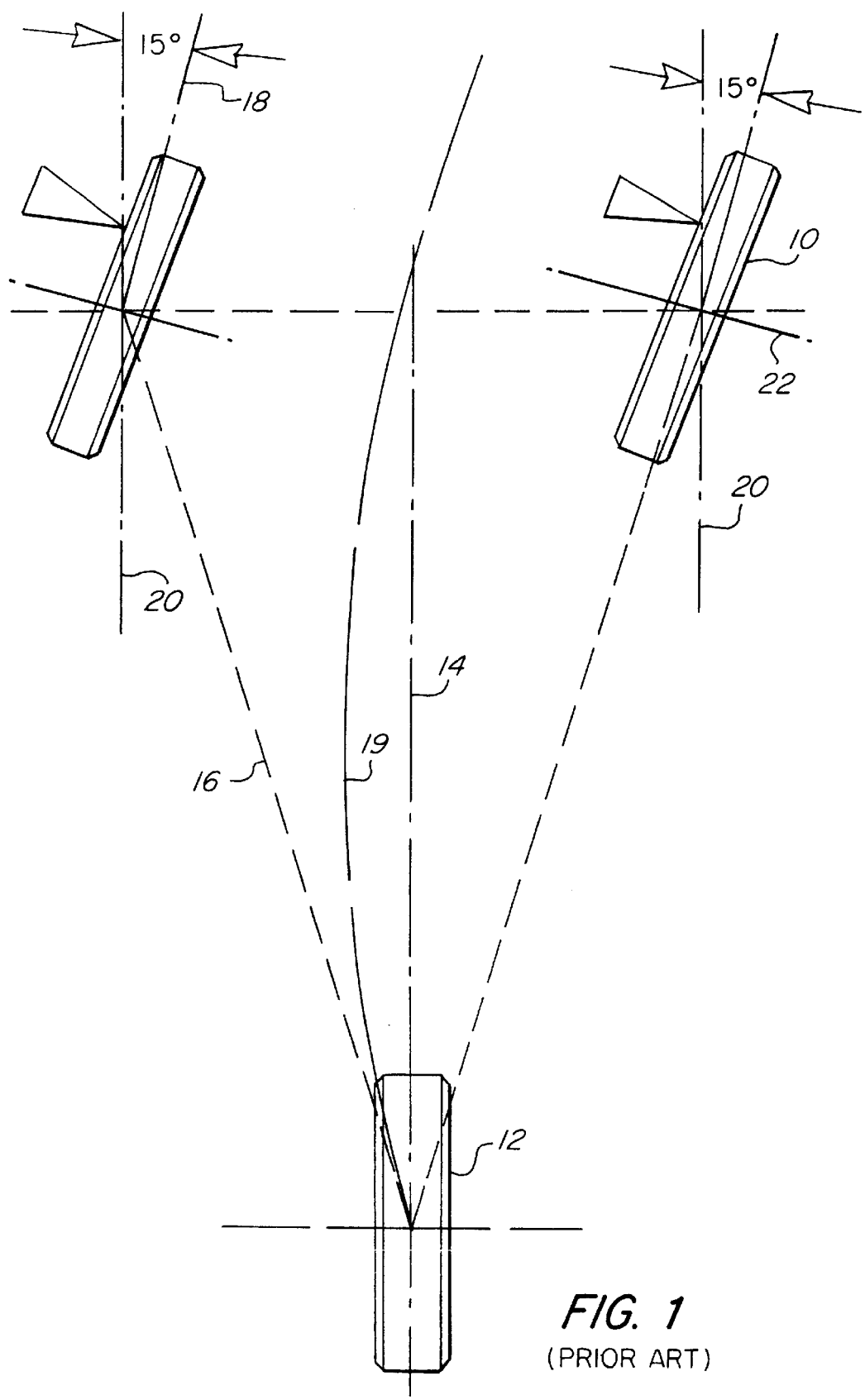
FIG. 1 is a diagrammatic view of the dragging action on the rear tire of a conventional swing arm wheel mounting assembly during turning of the vehicle.

Turning first to FIG. 1, therein illustrated diagrammatically is the effect on the fixed rear wheel 12 of the turning of the pivotably mounted front wheels 10. The longitudinal center line of the vehicle is designated by the numeral 14 and parallel lines through the center of the front wheels are designated by the numeral 20. The front wheels 10 are effectively tracking at an angle of about 15° along the lines 18 which are perpendicular to the axes of rotation of the wheels 10. Because the rear wheel 12 is fixed on the longitudinal axis 14, it is dragged sideways as the front end of the vehicle turns and tracks along the turning arc designated by the numeral 18.

Figure 2:
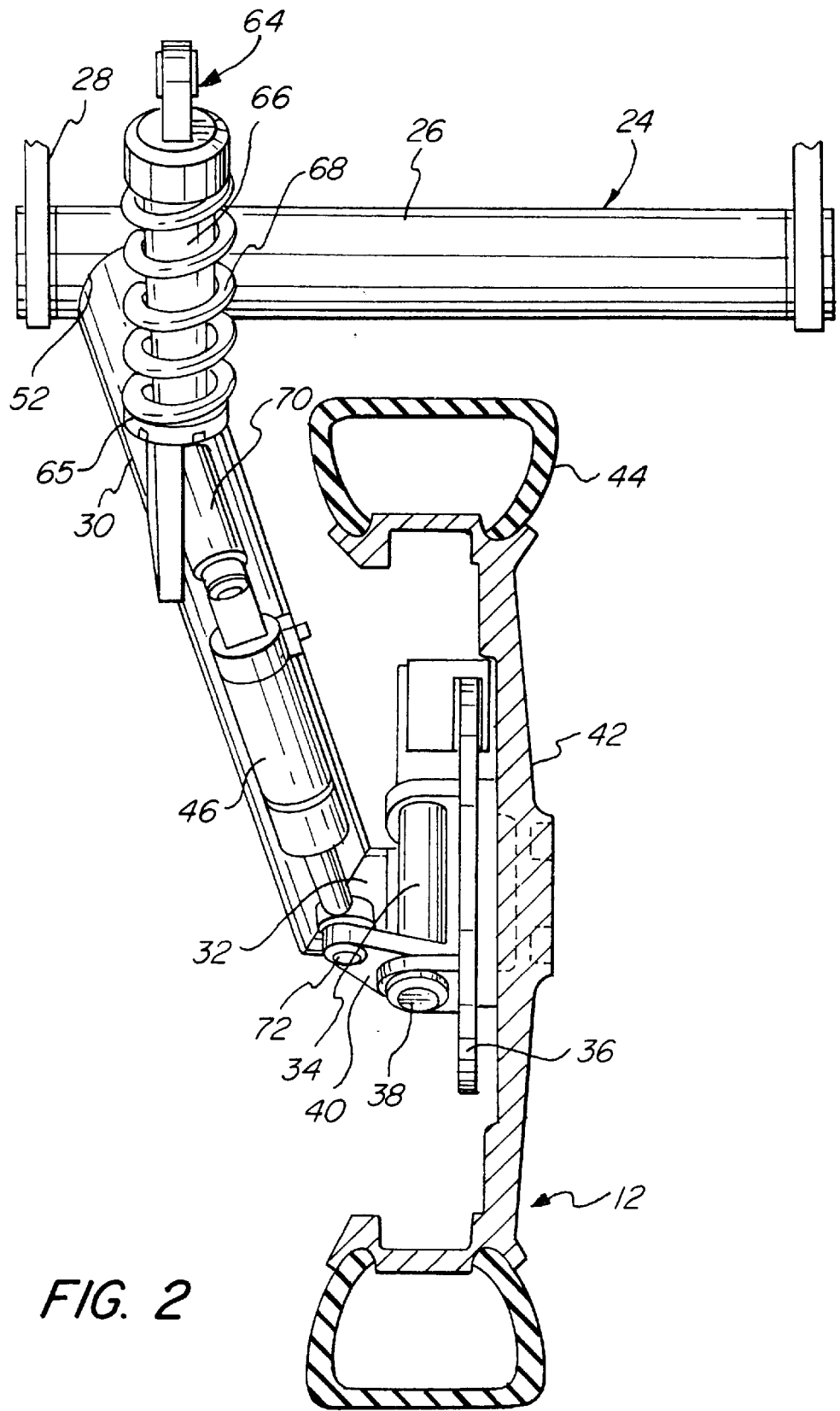
FIG. 2 is a top view of a swing arm wheel mounting assembly embodying the present invention with the wheel and tire broken away to permit illustration of the hub and bell crank assembly.
Figure 3:
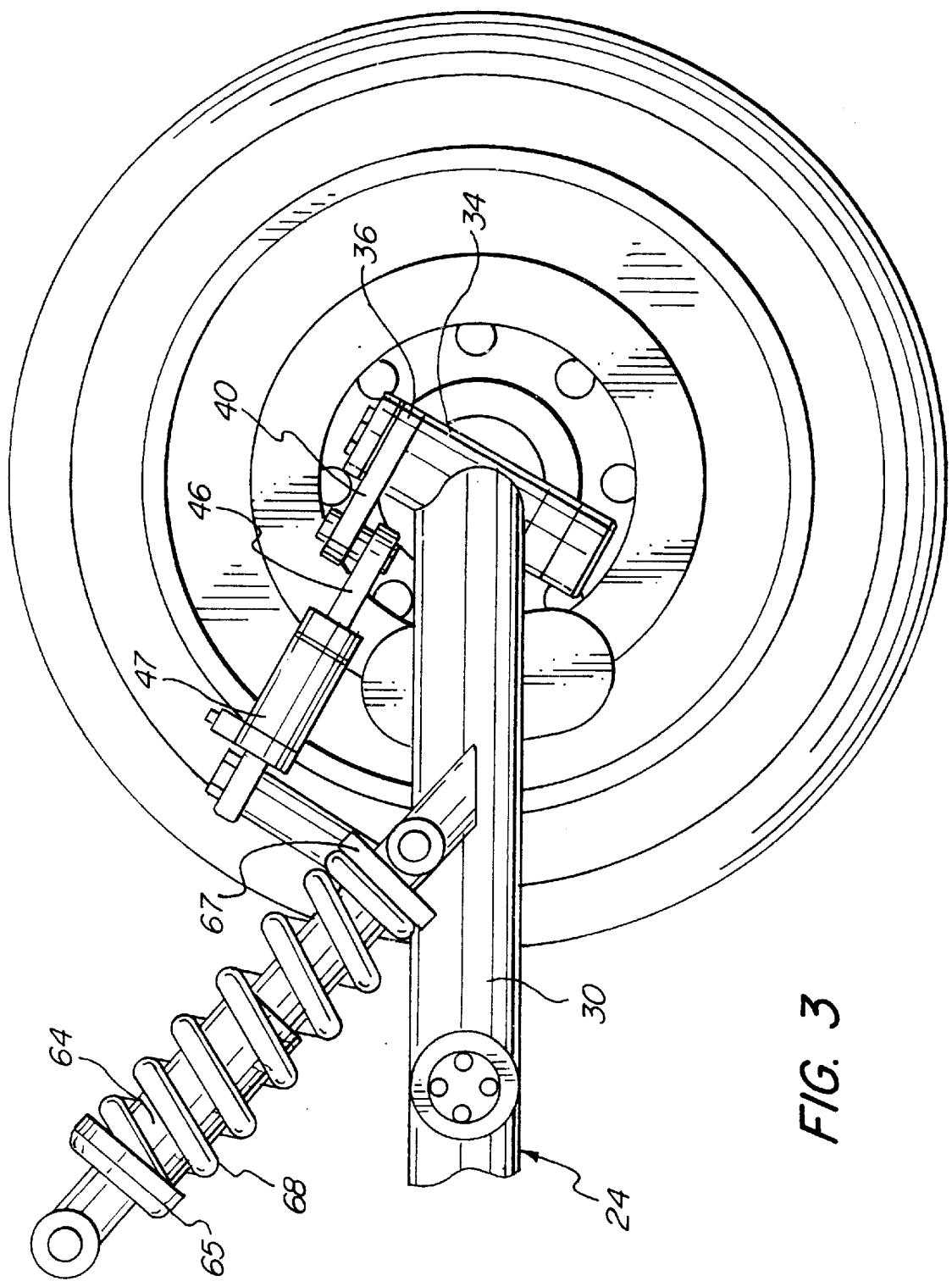
FIG. 3 is a fragmentary side elevational view of the swing arm/wheel mounting assembly.
Figure 4:
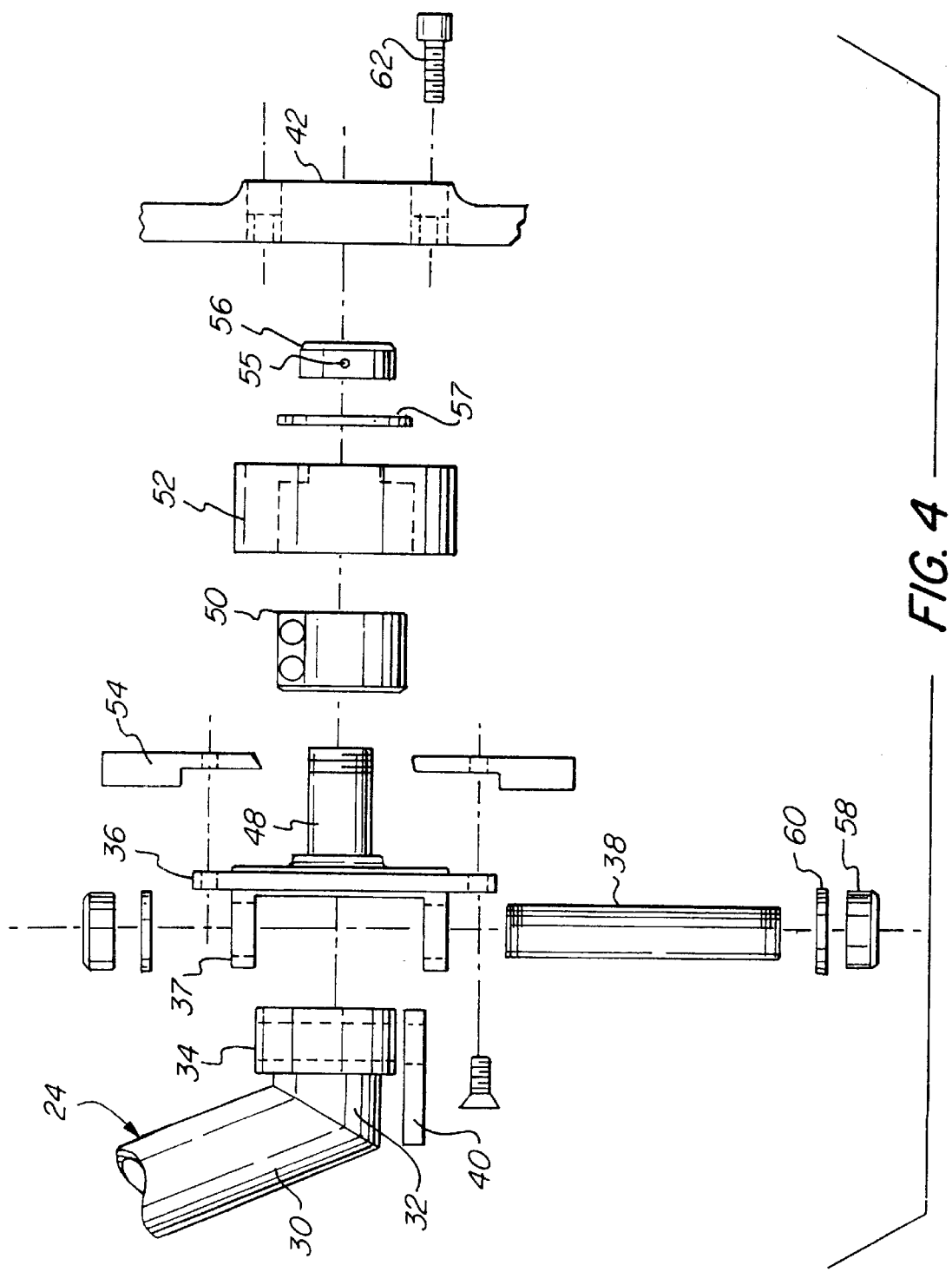
FIG. 4 is an exploded view of the components of the assembly excluding the dampening cylinder and shock assembly and with the swing arm only fragmentarily illustrated.
Figure 5:
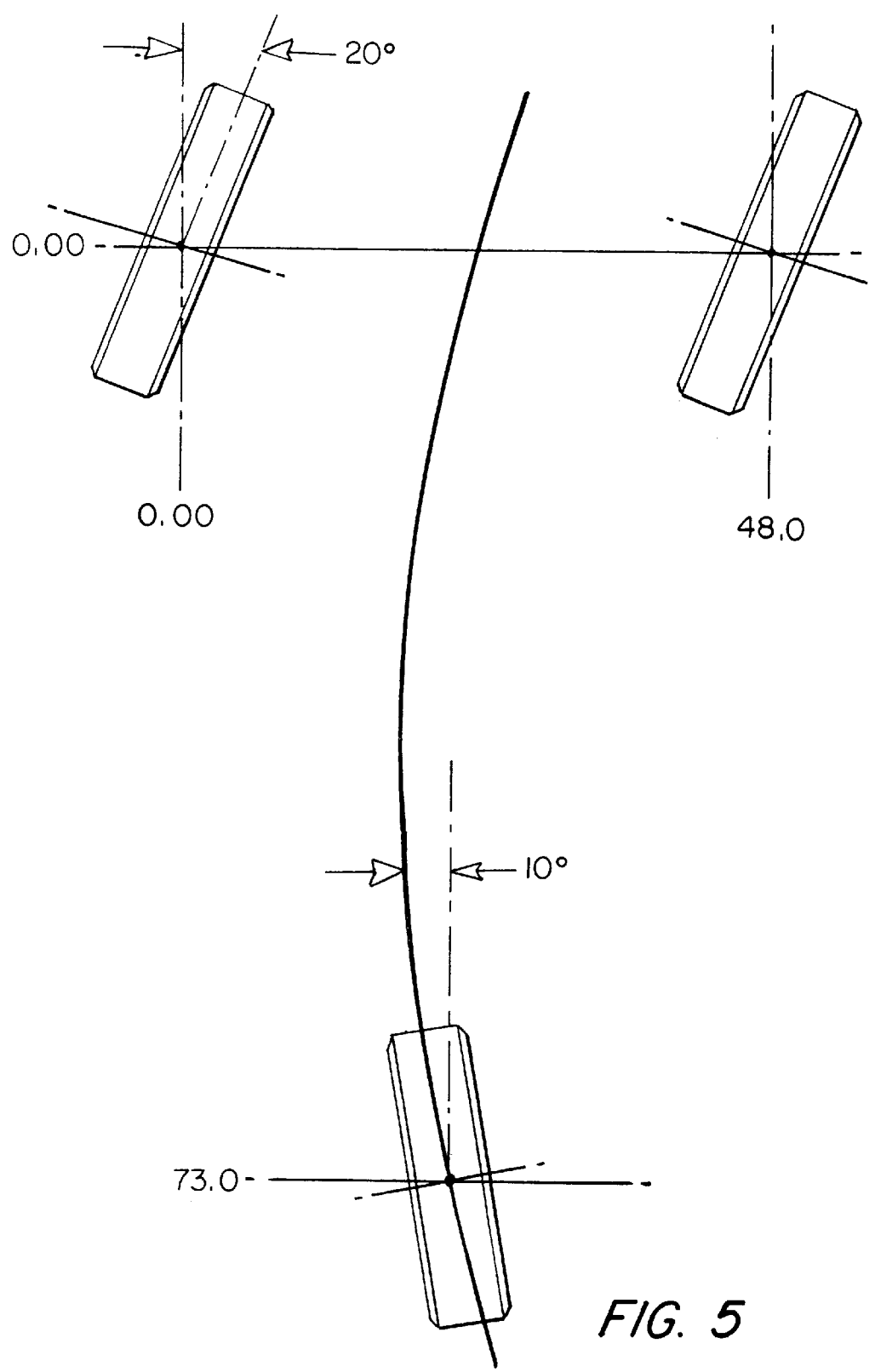
FIG. 5 is a diagrammatic view of the improved path of tracking movement of the rear tire provided by the present invention.

Turning now to FIGS. 2–4, therein illustrated is a swing arm assembly which enables the rear wheel 12 to pivot about a vertical axis as a result of the lateral forces exerted thereon by the turning motion. The swing arm assembly is generally designated by the numeral 24 and includes the tubular shaft 26 which is pivotably supported between the brackets 28 on the vehicle chassis (not shown). Extending rearwardly at an angle from the shaft 26 is the tubular swing arm 30 which has at its rearward end a laterally extending intermediate portion 32 and a tubular coupling 34 which is pivotably supported between the ears 37 of the clevis member generally designated by the numeral 36 by the pivot or king pin 38.

On the opposite side of the clevis member 36 is the axle 48 upon which is disposed the bearing 50, the hub 52 and washer 57, all of which are secured to the axle 48 by the lock nut 56 and cotter pin 55. The wheel 42 is secured to the hub 52 by the lug bolts 62.

Also secured to the clevis member 36 by the bolts 53 is the rotor 54. Extending about the wheel 42 is the tire 44.

Also mounted on the clevis 36 by the king pin 38 is a crank arm 40 which is keyed to the king pin 38. The outer end of the crank arm 40 supports one end of the piston 46 in the dampening cylinder assembly 47. The other end of the cylinder assembly 47 is supported in the bracket 70 on the swing arm 30 adjacent its forward end.

As seen in FIG. 2, a shock absorber assembly 64 is also provided. Its lower end is coupled to the swing arm 30 and its upper end is coupled to the chassis (not shown) and the coil spring 68 absorbs forces as it is compressed between the collars 65, 67 on the strut 66 during pivoting of the swing arm about the horizontal axis of its mounting to the chassis in accordance with conventional practice.

In the operation of this embodiment, the swing arm moves about its pivotal axis on the chassis in its usual manner, and the shock absorber will reduce the oscillation produced by vertical forces caused by bumps, holes and the like. When the driver turns the front wheel(s) in any direction, there is a lateral force applied to rear wheel. This lateral force causes pivoting of the wheel assembly about the generally vertical axis of the king pin to allow the rear wheel to follow an arcuate path cooperating with that of the front wheels. This pivotal action is limited by the dampening piston cylinder arrangement which returns the rear wheel to its vertical position along the longitudinal axis when the side pressure is reduced or terminated.

Figure 6:
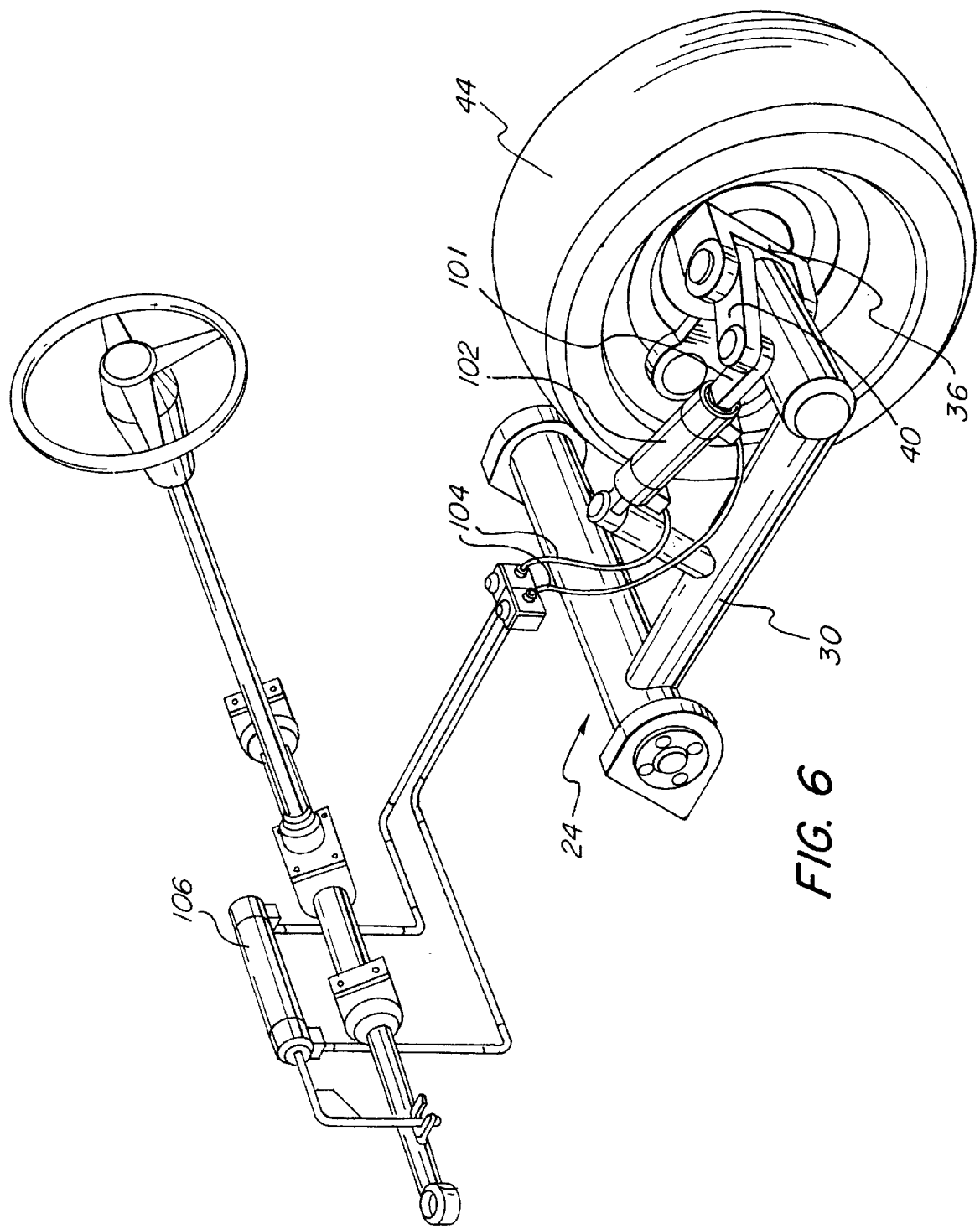
FIG. 6 is a perspective view of the present invention in an embodiment in which the hydraulic cylinder on the bell crank is coupled hydraulically to the front wheel steering assembly.

Turning now to the embodiment of FIG. 6, the dampening piston/cylinder 46, 47 have been replaced by a steering piston/cylinder 101, 102. Hoses 104 are connected to the hydraulic steering system 106 for the front wheels 10. When the operator acts to turn the front wheels 10, hydraulic fluid is also acting on the piston 101 in the cylinder 102 which in turn applies a pivotal force to the bell crank 40 to effect pivoting of the rear wheel about the king pin of the rear wheel assembly.

It will be readily appreciated that not all elements of the rear wheel mounting system have been illustrated such as calipers and other brake elements. Moreover, various of the components may be made from reinforced synthetic resins.

The improved tracking of the rear wheel will facilitate a rapid and safe turn, and reduce the wear on the rear tire. In the preferred embodiment, the hydraulic coupling of the rear wheel assembly to the front wheel assembly provides faster response.

Thus, it can be seen from the foregoing detailed specification and drawings that the rear wheel assembly of the present invention is one which may be fabricated easily and economically. It enables the rear wheel to track the arc of the front wheel rather than scuffing which produces tire wear, and it also provides better control of the vehicle during turning.

Having thus described the invention, what is claimed is:

1. A vehicle comprising:

(a) a chassis having a front and rear ends and a longitudinal axis;

(b) at least one front wheel mounted on said front end of said chassis for rotation about a first horizontal axis and for pivoting about a first vertical axis and steering means for pivoting said at least one front wheel to steer and thereby control the direction of movement of the vehicle;

(c) a rigid swing arm having its front end pivotally mounted on said rear end of said chassis for pivoting about a second horizontal axis perpendicular to said longitudinal axis;

(d) a wheel mounting assembly on the rear end of said swing arm including a hub and pivot means mounting said hub on the rear end of said swing arm for pivotal movement about a second vertical axis with respect to said second horizontal axis and said longitudinal axis; and (e) a rear wheel rotatably supported on said hub for rotation about a third horizontal axis, whereby said rear wheel naturally tracks said front wheel in a cooperating turning arc.

2. The vehicle in accordance with claim 1 wherein a shock absorber having a rear end mounted on said rigid swing arm and a front end mounted on said rear end of said chassis is provided for limiting the pivotal movement of the rigid arm about the second horizontal axis.

3. The vehicle in accordance with claim 1 wherein there is included a dampening mechanism having a rear end pivotally mounted to said pivot means and a front end pivotally mounted on said swing arm for providing tension and resisting movement of said hub about said second vertical axis.

4. The vehicle in accordance with claim 3 wherein said rear wheel assembly includes a clevis member with an axle extending therefrom, bearing means on said axle and wherein said rear wheel is rotatably seated on said bearing means.

5. The vehicle in accordance with claim 4 wherein said wheel mounting assembly includes a king pin seated in said clevis member and extending perpendicularly to an imaginary line extending through the axis of rotation of said rear wheel.

6. The vehicle in accordance with claim 5 wherein said rear wheel assembly includes a bell crank pivotably connected to said swing arm and supported in said clevis on said king pin, said bell crank coupling said swing arm to said clevis.

7. The vehicle in accordance with claim 6 wherein said bell crank is pivotally connected to one end of said dampening mechanism.

8. The vehicle in accordance with claim 7 wherein said dampening mechanism is a hydraulic steering mechanism coupled to said steering means for the front wheel to effect limited rotation of said bell crank and thereby said rear wheel assembly about said second vertical axis.

9. The vehicle in accordance with claim 1 wherein the other end of said dampening mechanism is connected to a strut on said swing arm adjacent its front end.

* * * * *